(12) United States Patent
AbuSamra

(10) Patent No.: US 7,684,919 B2
(45) Date of Patent: Mar. 23, 2010

(54) MULTIPLE SPEED TRANSMISSION HAVING FUEL ECONOMY MODE

(75) Inventor: Muneer AbuSamra, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 789 days.

(21) Appl. No.: 11/439,032

(22) Filed: May 23, 2006

(65) Prior Publication Data

US 2007/0276570 A1 Nov. 29, 2007

(51) Int. Cl.
*G06F 19/00* (2006.01)
*B60K 23/00* (2006.01)

(52) U.S. Cl. .............................. 701/54; 701/64; 477/115
(58) Field of Classification Search ........................ None
See application file for complete search history.

(56) References Cited

U.S. PATENT DOCUMENTS

| | | | | |
|---|---|---|---|---|
| 4,274,306 A | * | 6/1981 | Yokoi et al. | 477/121 |
| 4,463,629 A | | 8/1984 | Himmelstein | |
| 4,559,599 A | * | 12/1985 | Habu et al. | 701/62 |
| 4,677,556 A | * | 6/1987 | Habu | 701/64 |
| 5,337,239 A | * | 8/1994 | Okuda | 701/55 |
| 5,458,545 A | | 10/1995 | Adam et al. | |
| 5,795,264 A | * | 8/1998 | Steeby et al. | 477/124 |
| 6,401,022 B2 | | 6/2002 | Kubota et al. | |
| 6,418,365 B1 | | 7/2002 | Löffler et al. | |
| 6,454,676 B1 | | 9/2002 | Date et al. | |
| 6,616,575 B1 | * | 9/2003 | Lorentz | 477/115 |
| 6,830,537 B1 | | 12/2004 | Hollenbeck | |
| 6,985,804 B2 | * | 1/2006 | Minami | 701/64 |
| 7,512,477 B2 | * | 3/2009 | Quigley et al. | 701/103 |
| 2002/0132699 A1 | * | 9/2002 | Bellinger | 477/107 |

* cited by examiner

*Primary Examiner*—Michael J. Zanelli
(74) *Attorney, Agent, or Firm*—Brinks Hofer Gilson & Lione

(57) ABSTRACT

An method of operating a multiple speed (gear ratio) mechanical transmission and engine combination to optimize (reduce) fuel consumption comprises the steps of determining a fuel efficiency map for an engine, providing a multiple speed mechanical transmission controller having data and program storage capabilities, providing data regarding the fuel efficiency map to the controller and providing a control algorithm in the controller whereby operation of the engine/transmission combination is optimized for fuel economy in accordance with the fuel efficiency map.

25 Claims, 5 Drawing Sheets

MULTIPLE SPEED TRANSMISSION HAVING FUEL ECONOMY MODE

TECHNICAL FIELD

The invention relates generally to a method of efficiently operating a multiple speed transmission and engine combination and more specifically to a method of operating a multiple speed mechanical or automated mechanical transmission and engine combination which utilizes the fuel map of the particular type or brand of engine to optimize fuel consumption of the engine/transmission combination.

BACKGROUND

An unwavering goal of contemporary vehicle designers is the achievement of increased fuel efficiency, i.e., reduced fuel consumption. Designers of passenger cars, light trucks and long haul tractor trailers continually strive to improve the fuel efficiency of their vehicles while addressing other operating and performance parameters. While recent fuel consumption reductions stated in percent of hybrid vehicles are impressive, much smaller percentage fuel consumption reductions when applied to long haul tractor trailers typically represents much larger actual savings in fuel consumption because such vehicles consume more fuel on a miles per gallon basis and are driven many miles farther during any given period of time, for example, a year.

One of the improvements to long haul tractor trailers in recent years is the automated mechanical transmission. In this device, a relatively conventional multiple speed (gear ratio) heavy duty transmission includes an actuator assembly which is controlled by a master controller or microprocessor. The microprocessor includes a plurality of inputs which receive signals from various sensors such as speed sensors, a throttle position sensor, brake and ABS sensors, a shift selector, an operator controlled mode selector and other devices and, through the use of algorithms, computational routines, look-up tables and the like, controls operation of the master clutch and selection and engagement of transmission gears. Because such systems will consistently command upshifts and downshifts based upon the sensed conditions and established shift rules, fuel efficiency of such devices is generally good.

The fuel efficiency (consumption) of a particular engine, i.e., a particular size or output engine from a particular manufacturer, may be presented in a fuel efficiency map. This map relates fuel consumption as a function of engine speed, delivered torque and delivered horsepower. The fuel map includes a plurality of isograms or isolines of constant fuel consumption which are roughly arranged about a single value of speed and torque, i.e., a point, of maximum fuel efficiency. Stated somewhat differently, a single, vehicle operator or a single shift program when used with two engines having distinct fuel efficiency maps will be unable to achieve optimum fuel efficiency with both and may perform at a fuel efficiency well below that which could be obtained by commanding shifts based upon the fuel efficiency map of the given engine to achieve optimum fuel efficiency.

Different styles and designs of internal combustion engines and engines from different manufacturers have different fuel efficiency maps. Accordingly, if a truck or tractor manufacturer utilizes two or more different engines in a particular truck, the experience and habits of one operator utilizing a manual transmission or an automated mechanical transmission with the same control algorithm and operating logic will not provide optimum fuel efficiency in both trucks.

Such automated mechanical transmissions often have multiple control modes such as fully automatic and manual. The fully automatic mode may include several sub-modes that emphasize, that is, more heavily weight, one control variable or parameter over others. For example, one automatic control mode may emphasize performance, while another may provide improved control at very low vehicle speeds while a third may seek to minimize shifting by utilizing more widely separated upshift and downshift values.

The present invention is directed to further improving the fuel efficiency of multiple speed mechanical and automated mechanical transmission engine combinations.

SUMMARY

An method of operating a multiple speed mechanical transmission and engine combination to optimize (reduce) fuel consumption comprises the steps of determining a fuel efficiency map for an engine, providing a multiple speed transmission controller having program and data storage capabilities, providing and storing data regarding the fuel efficiency map in the controller and a providing a control algorithm in said controller whereby operation of the engine/transmission combination is optimized for fuel economy in accordance with the fuel efficiency map.

Thus it is an object of the present invention to provide a method of operating a multiple speed transmission and engine combination which provides improved fuel efficiency.

It is a further object of the present invention to provide a method of operating an automated mechanical transmission (AMT) and engine combination which provides improved fuel efficiency.

It is a still further object of the present invention to provide a method of operating a conventional manual transmission and engine combination which provides improved fuel efficiency.

It is a still further object of the present invention to provide a method of operating an automated manual transmission and engine combination which utilizes the fuel efficiency (consumption) map of a particular type of engine to maximize fuel efficiency.

It is a still further object of the present invention to provide a method of operating a conventional mechanical transmission and engine combination which utilizes the fuel efficiency (consumption) map of a particular type of engine to maximize fuel efficiency.

It is a still further object of the present invention to provide a method of operating an automated mechanical transmission and engine combination wherein the operation of the transmission is adjusted to match the fuel efficiency map of a particular engine.

Further objects and advantages of the present invention will become apparent by reference to the following description of the preferred embodiment and appended drawings wherein like reference numbers refer to the same component, element or feature.

DESCRIPTION OF THE PREFERRED EMBODIMENTS

Figure 1:
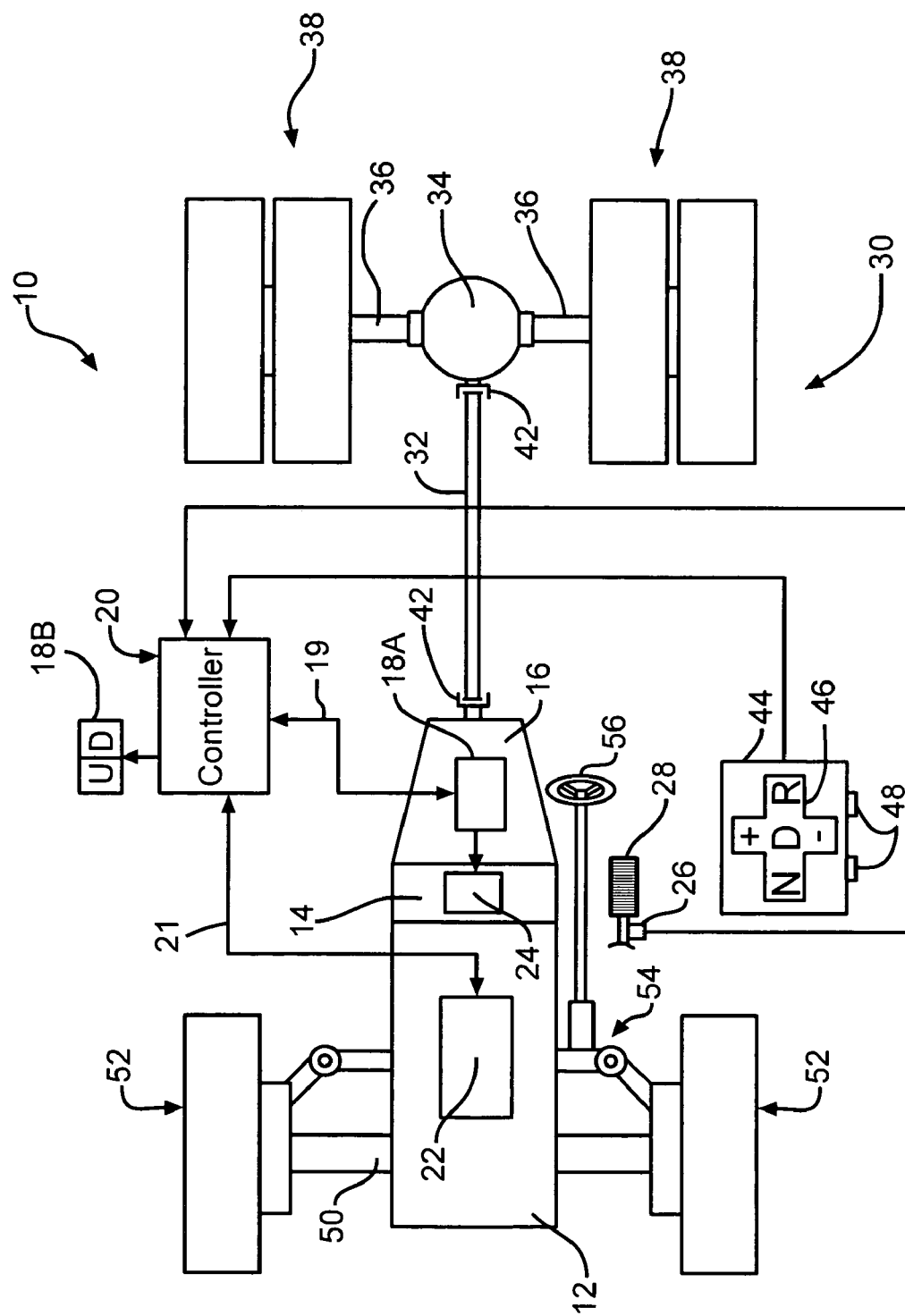
FIG. 1 is a diagrammatic, plan view of a motor vehicle driveline utilizing an automated mechanical transmission and controller incorporating the present invention.

Referring now to FIG. 1, a diagrammatic, plan view of a typical truck tractor incorporating the present invention is illustrated and generally designated by the reference number 10. The truck tractor 10 includes a prime mover 12 which may be an internal combustion gas or Diesel engine having an output provided directly to a master friction clutch 14. The master friction clutch 14 selectively and positively engages the output of the prime mover 12 to an input of a multiple speed, gear change transmission 16. The transmission 16 is preferably of the type currently designated as an automated mechanical transmission (AMT) wherein gear or speed ratio changes of a splitter, a main transmission, and a planetary gear assembly, for example, are all achieved by an automated, i.e., electric, hydraulic or pneumatic, shift actuator assembly 18A connected through a data or control link 19 to a master microprocessor or controller 20. Alternatively, the transmission 16 may be a conventional operator (manually) shifted multiple speed ratio transmission having a gear shift lever (not illustrated) extending into the cab of the truck tractor 10.

The master microprocessor or controller 20 includes data input ports, memory, one or more processors and data and control outputs driving, for example, the shift actuator assembly 18A or a visual or audible indicator 18B.

The master microprocessor or controller 20 is preferably coupled by a data and control link 21 to an engine controller 22. The engine controller 22 is an integral component of the prime mover 12 and will typically include a processor or controller which receives data from an engine speed sensor and other sensors or devices and controls (not illustrated), for example, a fuel control or metering device capable of adjusting and terminating the flow of fuel to the prime mover 12 and thus its speed. The master friction clutch 14 also includes a master friction clutch operator assembly 24 which controls the engagement and disengagement of the master friction clutch 14. Once again, as an alternative, the manual transmission 16 may be paired with a manual, i.e. vehicle operator actuator friction clutch. A throttle position sensor 26 senses the position of a vehicle throttle or accelerator pedal 28 and provides real time data regarding the position of the throttle pedal 28 to the master controller 20, which, in turn, typically will provide such data to the engine controller 22.

The output of the transmission 16 is provided to a rear driveline assembly 30 which includes a rear propshaft 32 which drives a conventional rear differential 34. The rear differential 34 provides drive torque to a pair of rear axles 36 which are in turn coupled to left and right rear tire and wheel assemblies 38 which may be either a dual configuration illustrated or a single left and right tire and wheel assembly. Suitable universal joints 42 may be utilized as necessary with the rear propshaft 32 to accommodate static and dynamic offsets and misalignments thereof.

Also disposed in the cab of the truck tractor 10 is an operator adjustable gear selector lever or assembly 44 having an output which is provided to the master controller 20. The gear selector lever assembly 44 defines a shift pattern 46 through which the vehicle operator may select, for example, whether the master controller 20 will automatically select and shift between available gears of the transmission 16 or defeat or override such automatic selection and manually select and engage a desired gear. One or more push buttons or toggle switches 48, for example, may be utilized to receive commands from the operator to select or de-select an operating mode or condition such as the fuel economy mode of the present invention. A stationary front axle 50 pivotally supports a pair of front tire and wheel assemblies 52 which are controllably pivoted by a steering linkage 54 which is coupled to and positioned by a steering wheel 56.

Figure 2:
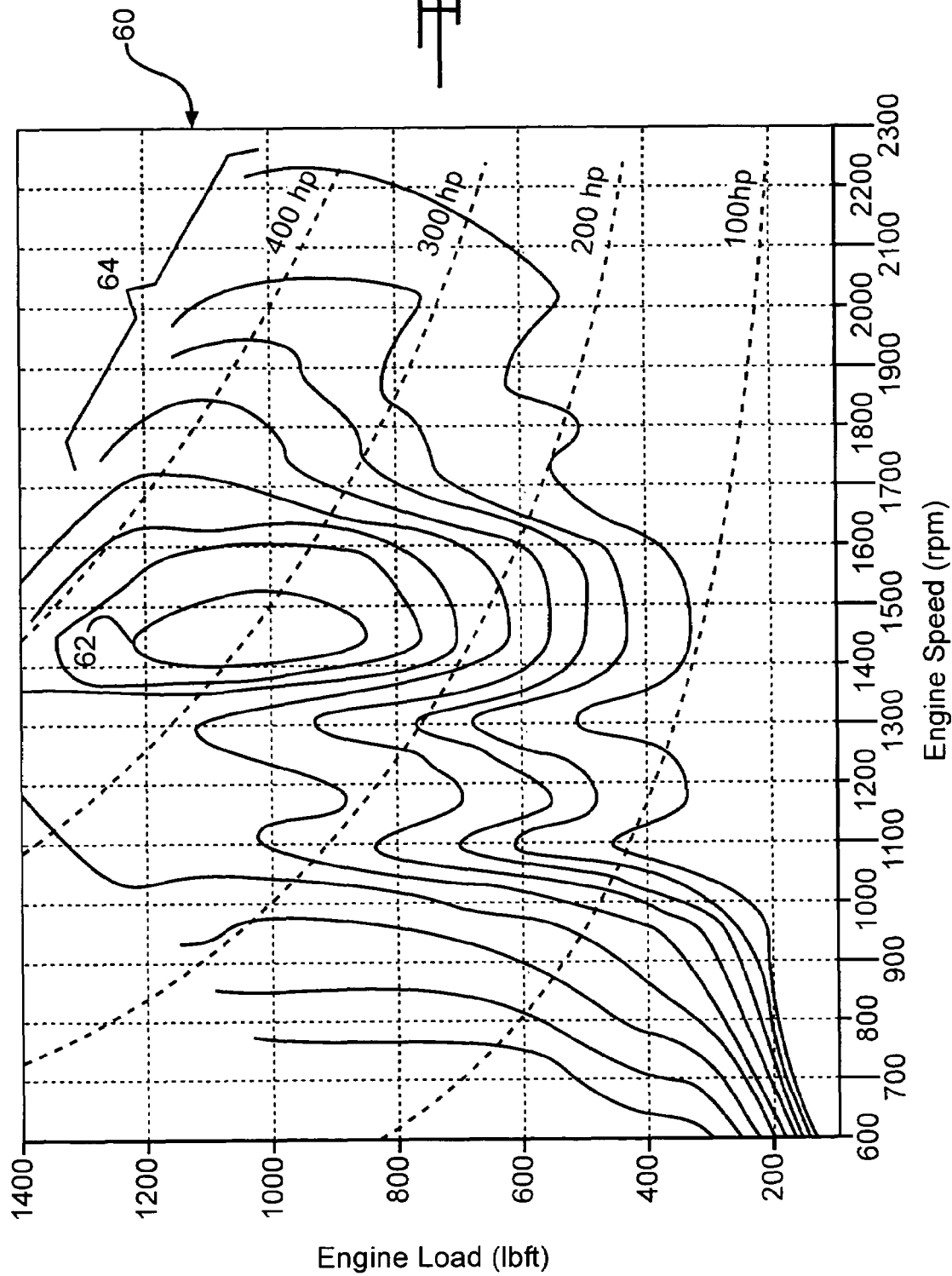
FIG. 2 is a typical or representative fuel efficiency map of a first particular type or brand of internal combustion engine.
Figure 3:
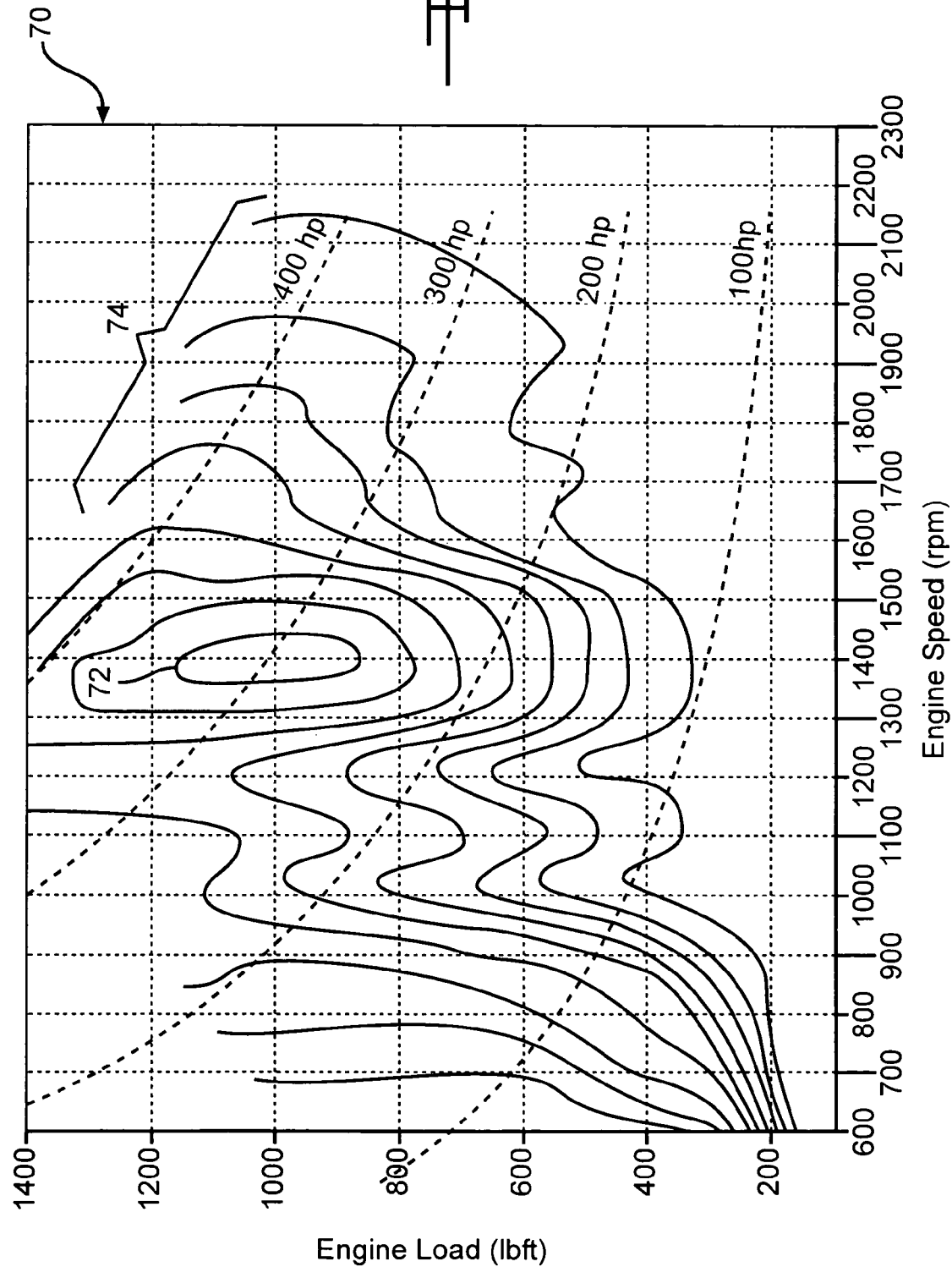
FIG. 3 is a typical or representative fuel efficiency map of a second particular type or brand of internal combustion engine.

Reference to FIGS. 2 and 3 will clarify two important aspects of the invention. FIGS. 2 and 3 present two fuel (efficiency) maps 60 and 70 which set forth the fuel consumption (efficiency) of two different brands, types or models of internal combustion truck engines as a function of engine speed and engine torque output. Engine speed in revolutions per minute (RPM) is presented along the X axis of FIGS. 2 and 3 and engine torque output (lb.ft) is presented along the Y axis of FIGS. 2 and 3. Curved dashed lines superimposed on the isograms of the graphs represent various levels of horsepower output of an engine or prime mover 12. The irregular lines or curves of the graph are isograms (isolines) of constant fuel consumption.

The fuel maps 60 and 70 may also be viewed as three dimensional, i.e., topologic, maps with surfaces sloping down and away from a point (peak) disposed with a closed, oblong region or isogram 62. The fuel map 60 represents the operational characteristics of a first, particular engine or prime mover 12. It should be understood, however, that the fuel map 60 is presented by way of example and illustration only. The closed, oblong region or isogram 62 generally disposed in the middle of the fuel map 60 represents a region of substantially optimum, i.e., maximum, fuel efficiency or minimum fuel consumption relative to maximum energy output. The condition of optimum fuel efficiency is, as noted, a point within the region 62. Each isogram or isoline 64 more distant from this closed, oblong isogram 62 represents operating conditions having increased but constant fuel efficiency. All of the isograms or isolines 62 and 64 represent varying operating conditions of engine speed and load having constant fuel efficiency or consumption measured, for example, by brake specific fuel consumption (BSFC).

Referring now to FIG. 3, a fuel (efficiency) map 70 for a second, distinct brand, type or model of internal combustion engine or prime mover 12 is illustrated. Here, the oblong region or isogram 72 likewise represents a region of substantially optimum fuel efficiency. As noted, the best fuel efficiency is represented by a point within the isogram 72. The surrounding isograms or isolines 74 represent lines of constant fuel efficiency; the farther away from the isogram 72, the poorer the fuel efficiency.

Through inspection and study of the fuel maps 60 and 70 of FIGS. 2 and 3, it will become apparent that from the standpoint of the engines or prime movers 12, maximum fuel efficiency, i.e., minimum fuel consumption, occurs within relatively small operating regions of the engines or prime movers 12, in FIG. 2, between 1400 and 1500 rpm and in FIG. 3, between 1350 and 1450 rpm when the engines or prime movers 12 are developing between about 900 and 1100 pounds feet of torque which is approximately 300 horsepower.

Second of all, study and inspection of FIGS. 2 and 3 reveals that the two graphs or fuel maps 60 and 70 and the respective sets of isograms 62, 64, 72 and 74 are distinct. They are distinct because they represent two distinct internal combustion engines. Because the engines or prime movers 12, their operation and fuel maps 60 and 70 are distinct, a shift program optimized for a given variable, such as fuel efficiency for one, will not provide optimization of the same parameter for the other. Stated somewhat differently, a single or common operating shift program for one prime mover 12 having, for example, a fuel map 60 such as illustrated in FIG. 2 will not provide, with only random exceptions, optimum operation with another prime mover 12 having a different fuel map such as the fuel map 70 illustrated in FIG. 3.

Thus, the present invention utilizes the data contained in the fuel map of a particular engine or prime mover 12 which may be stored in the master controller 20 to influence the shift program of the master controller 20. Specifically, when an economy mode has been engaged, operation of the prime mover 12 and the transmission 16, are adjusted within limits, to operate within, or as near as possible to, the closed, oblong isograms 62 and 72 representing that operation providing the best fuel economy associated with a specific manufacturer, design or type of engine or prime mover 12.

Accordingly, the first aspect of the invention is to read and store the fuel map data 60 or 70, for example, for a particular manufacturer and design or type of engine or prime mover 12 such as a Diesel engine within the memory of the master microprocessor controller 20. The data designating the closed, oblong region or isogram 62 such as the engine speed and engine load, and horsepower if desired, as discussed above, is the most critical with corresponding data more distant the closed, oblong isogram 62 of increasingly less significance. That is, data regarding the isogram 64 most removed from the closed, oblong isogram 62 is of negligible importance whereas those isograms 64 more proximate the closed, oblong isogram 62 are more important. Similarly, while it is apparent that both engine speed and engine load cooperatively determine the fuel efficiency, engine speed is the controllable variable whereas engine load is a function of primarily the speed of the vehicle and the currently selected operating gear ratio. Thus, even though, for example, in FIG. 2, engine speed may be between 1400 and 1500 rpm, if the engine load is low, engine efficiency may be significantly below that enjoyed when the engine is operating at a design load and horsepower, for example, 1000 pound feet and 300 horsepower. In other words, only when the engine or prime mover 12 is operating in the vicinity of its nominal rated torque output and horsepower will it achieve optimum fuel efficiency. This, in turn, means that defining and operating a prime mover 12 such as a gas or Diesel engine in an economy mode is most significant in the higher number (lower actual numerical) gear ratios.

Figure 4:
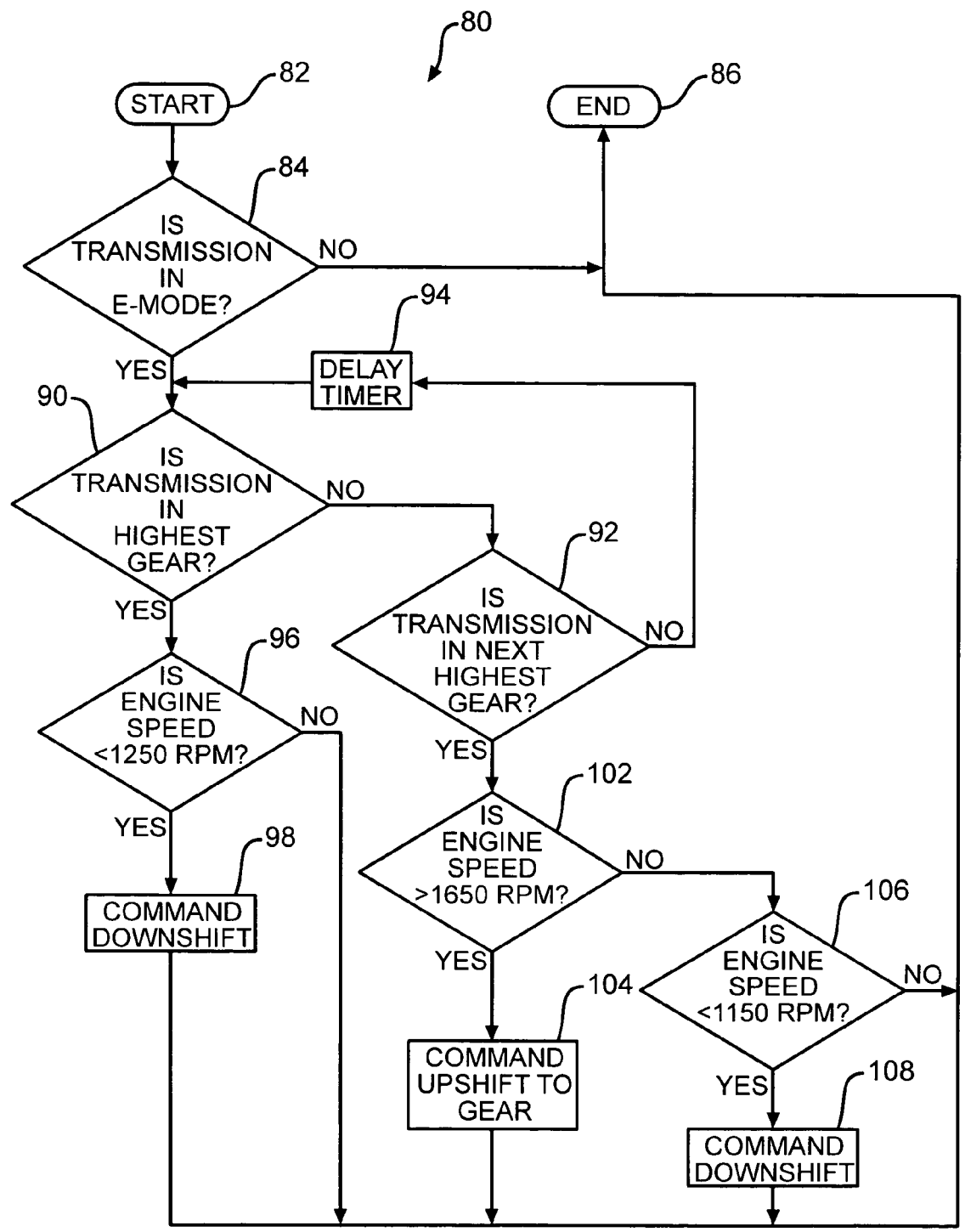
FIG. 4 is a block diagram of a computer program for use with an automated mechanical transmission which embodies the present invention.

Referring now to FIG. 4, once data from a fuel map such as the fuel maps 60 or 70 referring to a particular engine or prime mover 12 is stored in the master microprocessor or controller 20, an economy mode program or subroutine 80 may be executed. The program 80 starts with an initialization step 82 and moves to a first decision point 84 which determines whether an operator manipulatable switch or push button 48 or a certain motion of the gear selector lever assembly 44 has established that the driver wishes to engage the economy mode of the transmission 16. If the economy mode of the transmission 16 has not been activated, the decision point 84 exits at NO and the program 80 terminates at an end point 86.

If the economy mode of the transmission 16 has been activated, the decision point 84 is exited at YES and a second decision point 90 is entered which inquires whether the transmission 16 is in its highest number (lowest numerical ratio) gear. If it is not, the program 80 moves to a third decision point 92 which inquires whether the transmission assembly 16 is in its next highest gear. If it is not, the third decision point 92 is exited at NO and a process step 94 is entered which activates and counts down a short duration timer. The timer may define a delay of typically between two and ten seconds or more or less depending upon the dynamic performance of the vehicle, the specific type of the vehicle and other operating and mechanical parameters. Once the delay timer times out its predetermined period, the program 80 returns to the input of the decision point 90. If the transmission is in the highest gear, the decision point 90 is exited at YES and a fourth decision point 96 next inquires whether the speed of the engine or prime mover 12 is less than, for example 1150 rpm. If it is not, the decision point is exited at NO and the program 80 terminates at the end point 86. If the speed of the engine or prime mover 12 is less than 1250 rpm, a process step 98 is entered which commands a downshift to increase the speed of the engine or prime mover 12 and move it closer to the maximum efficiency closed isogram 62. Again, the program 80 terminates at the end point 86.

Returning to the decision point 92, if the transmission 16 is in the next to the highest gear, the decision point 92 is exited at YES and a decision point 102 is entered which inquires whether the speed of the engine or prime mover 12 is greater than 1650 rpm. If it is, the decision point 102 is exited at YES and the program 80 enters a process step 104 which commands an upshift of the transmission assembly 16 to the highest gear in order to slow the speed of the engine or prime mover 12 and move the operating point to the left in FIG. 2, closer to the isogram 62.

Returning to the decision point 102, if the speed of the engine or primer mover 12 is not greater than 1650 rpm, the decision point 102 is exited at NO and the program 80 enters a decision point 106 which inquires whether the speed of the engine or prime mover 12 is less than 1150 rpm. If it is not, the decision point 106 is exited at NO and the program concludes at the end point 86. If the speed of the engine or prime mover is less than, for example, 1150 rpm, the decision point 106 is exited at YES and the program 80 enters a process step 108 which commands a downshift of the transmission 16 to increase the rpm of the engine or prime mover 12 and move the operating point to the right, more proximate the isogram 62.

It will be appreciated that the fuel maps 60 and 70 and the upshift and downshift values presented in FIG. 4 and the above text are illustrative and utilized by way of example only. As stated previously, inasmuch as each type or configuration of engine or prime mover 12 from each particular manufacturer will define a distinct fuel (efficiency) map, the numerical shift r.p.m. values will be adjusted to match such fuel maps and provide optimum fuel efficiency consistent with established automated mechanical transmission shift protocols while maintaining the required power output of the engine/transmission combination.

It will also be appreciated that the foregoing economy mode program 80 has discussed operation only in the highest two gears (lowest numerical ratios) of the transmission 16. It should be appreciated that certain vehicles, performance and service requirements may encourage or necessitate operation in the economy or fuel efficiency mode of the present invention in lower gears, for example, ninth and tenth gears of a twelve speed transmission. To enable such operation in, for example, the four highest gears, the decision points 90 and 92 must be augmented or modified to inquire regarding additional gear ratios or selections.

Figure 5:
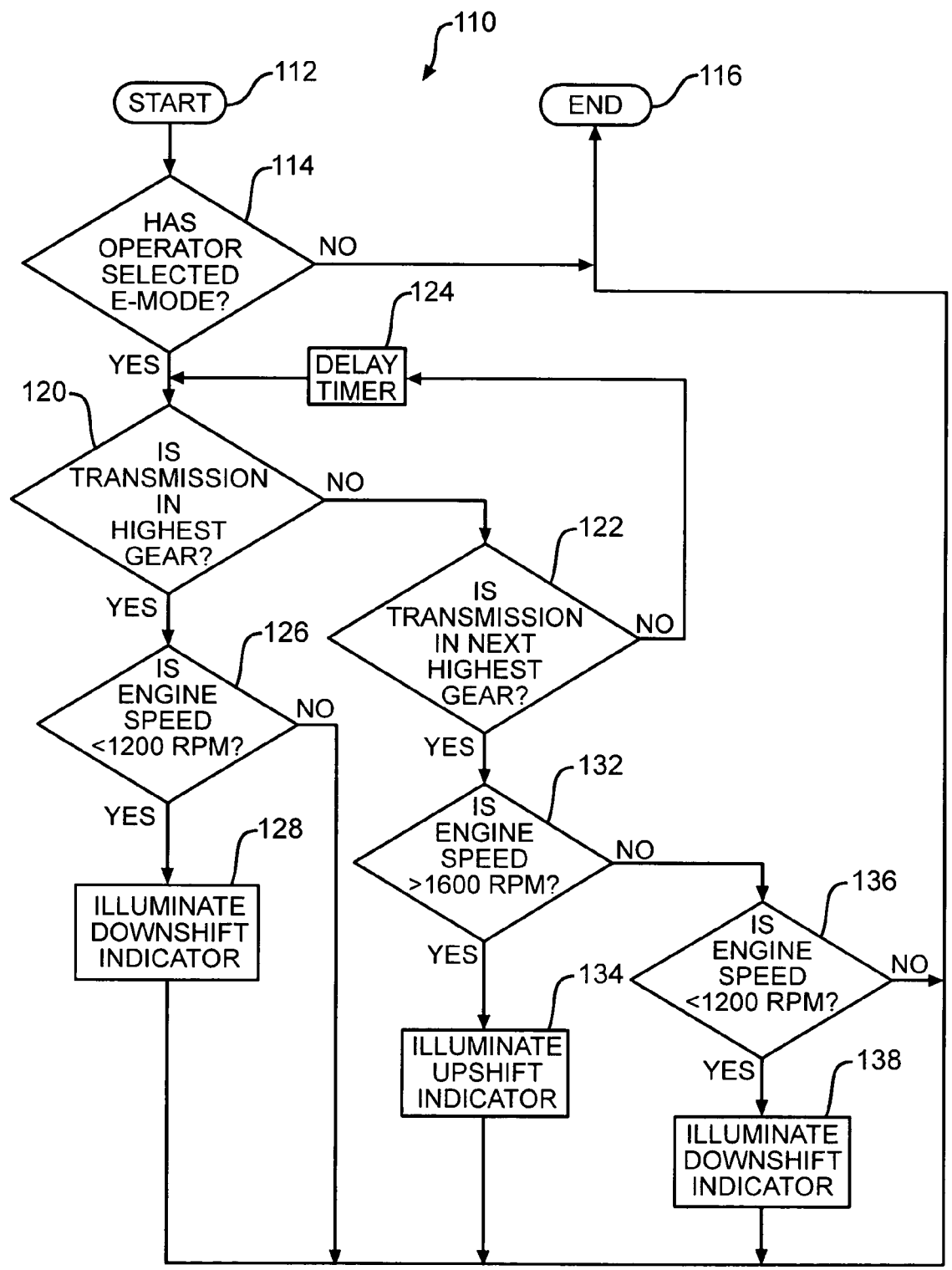
FIG. 5 is a block diagram of a computer program for use with a conventional mechanical transmission which embodies the present invention.

Referring now to FIG. 5, operation of an engine/transmission combination wherein the transmission and clutch are manually, i.e. by the vehicle operator, controlled will now be described. Again, it is first necessary to load data from a fuel map such as the fuel maps 60 or 70 referring to a particular engine or prime mover 12 into the master microprocessor or controller 20. Then, a manual transmission economy mode program or subroutine 110 may be selected and executed. The program 110 starts with an initialization step 112 and moves to a decision point 114 which determines whether an operator controlled switch or push button 48 has been activated to indicate that the vehicle operator wishes to drive or operate in the economy mode. If the economy mode has not been selected, the first decision point 114 exits at NO and the program 110 terminates at an end point 116.

If the economy mode has been selected, the decision point 114 is exited at YES and a second decision point 120 is entered which inquires whether the transmission 16 is in its highest number (lowest numerical ratio) gear. If it is not, the program 110 moves to a third decision point 122 which inquires whether the transmission 16 is in its next highest gear. If it is not, the third decision point 122 is exited at NO and a process step 124 is entered which activates and counts down a short duration timer. The timer of the process step 124 may define a delay of typically between two and ten seconds or more or less depending upon the dynamic performance of the vehicle, the specific type of the vehicle and other operating and mechanical parameters. Once the delay timer of the process step 124 times out its predetermined period, the program 110 returns to the input of the second decision point 120. If the transmission is in the highest gear, the second decision point 120 is exited at YES and a fourth decision point 126 next inquires whether the speed of the engine or prime mover 12 is less than, for example, 1200 rpm. If it is not, the fourth decision point 126 is exited at NO and the program 110 terminates at the end point 116. If the speed of the engine or prime mover 12 is less than 1200 rpm, a process step 128 is entered which illuminates an indicator light, or provides another graphic, audible or tactile signal to the vehicle operator to downshift the transmission 16 to increase the speed of the engine or prime mover 12 and move such speed closer to the maximum efficiency closed isogram 62. Again, the program 110 terminates at the end point 116.

Returning to the third decision point 122, if the transmission 16 is in the next to the highest gear, the decision point 122 is exited at YES and a fifth decision point 132 is entered which inquires whether the speed of the engine or prime mover 12 is greater than 1600 rpm. If it is, the decision point 132 is exited at YES and the program 110 enters a process step 134 which illuminates an indicator light or provides another graphic, audible or tactile signal to the vehicle operator to upshift the transmission 16 to the highest gear in order to slow the speed of the engine or prime mover 12 and move the operating point to the left in FIG. 2, closer to the isogram 62.

Returning to the fifth decision point 132, if the speed of the engine or primer mover 12 is not greater than 1600 rpm, the decision point 132 is exited at NO and the program 110 enters a sixth decision point 136 which inquires whether the speed of the engine or prime mover 12 is less than 1200 rpm. If it is not, the decision point 136 is exited at NO and the program 1110 concludes at the end point 116. If the speed of the engine or prime mover is less than, for example, 1200 rpm, the fifth decision point 136 is exited at YES and the program 110 enters a process step 138 which illuminates an indicator light or provides other graphic, audible or tactile signal to the vehicle operator to downshift the transmission 16 to increase the rpm of the engine or prime mover 12 and move the operating point to the right, more proximate the isogram 62.

It will be appreciated that the fuel maps 60 and 70 and the upshift and downshift values presented in FIG. 5 and the above text are illustrative and utilized by way of example only. As stated previously, inasmuch as each type or configuration of engine or prime mover 12 from each particular manufacturer will define a distinct fuel (efficiency) map, the numerical shift rpm values of the program 110 will be adjusted to match such fuel maps and provide optimum fuel efficiency consistent with established mechanical transmission operation while maintaining the required power output of the engine/transmission combination.

It will also be appreciated that the foregoing economy mode program 110 has discussed operation only in the highest two gears (lowest numerical ratios) of the transmission 16. It should be appreciated that just as with the program 80, the program 110 may be augmented to function with the three or four highest gears of a manual transmission 16.

The foregoing disclosure is the best mode devised by the inventor for practicing this invention. It is apparent, however, that apparatus incorporating modifications and variations will be obvious to one skilled in the art of automated mechanical transmissions. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A method of operating a multiple speed transmission having a transmission controller with a memory, comprising:
    performing by the transmission controller:
        receiving from an internal combustion engine controller a portion of a fuel map for an internal combustion engine having an operating region of optimum efficiency, wherein said internal combustion engine controller is operable to control a flow of fuel to said internal combustion engine;
        storing said portion in said memory;
        providing an upshift command when a speed of said internal combustion engine is greater than a speed associated with said operating region of optimum efficiency by a first predetermined value; and
        providing a downshift command when said speed of said internal combustion engine is less than said speed associated with said operating region of optimum efficiency by a second predetermined value.

2. The method of claim 1, further comprising determining if an enable signal has been received, wherein said providing an upshift command comprises providing an upshift command if said enable signal has been received.

3. The method of claim 2, further comprising receiving said enable signal from a vehicle operator.

4. The method of claim 1, wherein said transmission controller receives speed data from said internal combustion engine.

5. The method of claim 1, wherein said method operates in the highest three gears of said multiple speed transmission.

6. The method of claim 1, wherein said portion of said fuel map comprises engine speed data and engine load data.

7. The method of claim 1, wherein said first predetermined values and said second predetermined value are less than 200 revolutions per minute.

8. The method of claim 1, wherein said multiple speed transmission comprises an automated mechanical transmission, further comprising transmitting said upshift command and said downshift command to a transmission actuator.

9. The method of claim 1, wherein said multiple speed transmission comprises a manual transmission, further comprising transmitting said upshift command and said downshift command to an indicator.

10. A multiple speed transmission system providing improved fuel efficiency comprising:
- a multiple speed transmission;
- a transmission controller for said multiple speed transmission having a memory, said transmission controller operable to:
    - receive from an internal combustion engine controller at least a portion of a fuel map for an internal combustion engine having an operating condition of optimum efficiency, wherein said internal combustion engine controller is operable to control a flow of fuel to said internal combustion engine;
    - store said portion of said fuel map in said memory;
    - provide an upshift command when a speed of said internal combustion engine is greater than a speed associated with said operating condition of optimum efficiency by a first predetermined value; and
    - provide a downshift command when said speed of said internal combustion engine is less than said speed associated with said operating condition of optimum efficiency by a second predetermined value.

11. The multiple speed transmission system of claim 10, further comprising an operator manipulable device operable to enable said transmission controller to provide said upshift command and said downshift command.

12. The multiple speed transmission system of claim 10, wherein said transmission controller is further operable to receive an input from a vehicle operator to enable said transmission controller to provide said upshift command and said downshift command.

13. The multiple speed transmission system of claim 10, wherein said transmission controller is further operable to receives speed data from said internal combustion engine.

14. The multiple speed transmission system of claim 10, wherein said transmission controller is operable to provide said upshift command and said downshift command when said multiple speed transmission is engaged in one of the highest three gears of said multiple speed transmission.

15. The multiple speed transmission system of claim 10, wherein said portion of said fuel map comprises speed data and engine load data.

16. The multiple speed transmission system of claim 10, wherein said first predetermined values and said second predetermined value are less than 200 revolutions per minute.

17. The multiple speed transmission system of claim 10, wherein said multiple speed transmission comprises an automated mechanical transmission, and wherein said transmission controller is further operable to transmit said upshift command and said downshift command to a transmission actuator.

18. The multiple speed transmission system of claim 10, wherein said multiple speed transmission comprises a manual transmission, and wherein said transmission controller is further operable to transmit said upshift command and said downshift command to an indicator.

19. A method of operating a multiple speed transmission having a transmission controller with a memory, comprising:
- performing by the transmission controller:
    - receiving from an internal combustion engine controller data corresponding to a fuel map for an internal combustion engine regarding an operating condition of optimum efficiency, wherein said internal combustion engine controller is operable to control a flow of fuel to said internal combustion engine;
    - storing said data in said memory;
    - providing an upshift command when a speed of said internal combustion engine is greater than a speed associated with said operating condition of optimum efficiency by a first predetermined value; and
    - providing a downshift command when said speed of said internal combustion engine is less than said speed associated with said operating condition of optimum efficiency by a second predetermined value.

20. The method of claim 19, further comprising determining if an enable signal has been received, wherein said providing an upshift command comprises providing an upshift command if said enable signal has been received.

21. The method of claim 19, wherein said transmission controller receives speed data from said internal combustion engine.

22. The method of claim 19, wherein said data corresponding to said fuel map comprises data associated with engine speed and engine load.

23. The method of claim 19, wherein said first predetermined values and said second predetermined value are less than 200 revolutions per minute.

24. The method of claim 19, wherein said multiple speed transmission comprises an automated mechanical transmission, further comprising transmitting said upshift command and said downshift command to a transmission actuator.

25. The method of claim 19, wherein said multiple speed transmission comprises a manual transmission, further comprising transmitting said upshift command and said downshift command to an indicator.

* * * * *

UNITED STATES PATENT AND TRADEMARK OFFICE
CERTIFICATE OF CORRECTION

| | | |
|---|---|---|
| PATENT NO. | : 7,684,919 B2 | |
| APPLICATION NO. | : 11/439032 | |
| DATED | : March 23, 2010 | |
| INVENTOR(S) | : Muneer AbuSamra | |

It is certified that error appears in the above-identified patent and that said Letters Patent is hereby corrected as shown below:

In the Claims

Column 8, claim 7, line 57, before "and said second predetermined" replace "values" with --value--.

Column 9, claim 13, line 33, before "speed data from said" replace "receives" with --receive--.

Column 9, claim 16, line 43, after "said first predetermined" replace "values" with --value--.

Column 10, claim 23, line 38, before "and said second predetermined" replace "values" with --value--.

Signed and Sealed this
Eighth Day of March, 2011

David J. Kappos
*Director of the United States Patent and Trademark Office*